Figure 1:
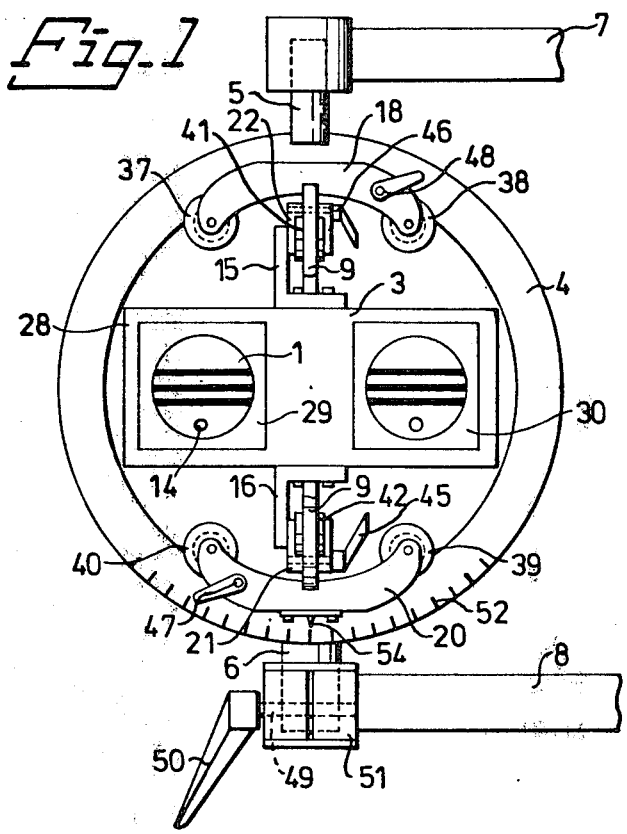

United States Patent [19]

Bergkvist

[11] 4,343,090
[45] Aug. 10, 1982

[54] SUSPENSION DEVICE FOR ANGLE INDICATOR

[76] Inventor: Lars A. Bergkvist, Vastmansvagen 16, 890 23 Sjalevad, Sweden

[21] Appl. No.: 200,494

[22] PCT Filed: Nov. 30, 1979

[86] PCT No.: PCT/SE79/00243
§ 371 Date: Aug. 1, 1980
§ 102(e) Date: Jul. 21, 1980

[87] PCT Pub. No.: WO80/01202
PCT Pub. Date: Jun. 12, 1980

[30] Foreign Application Priority Data

Dec. 1, 1978 [SE] Sweden .................................. 7812389

[51] Int. Cl.³ .............................................. G01C 1/00
[52] U.S. Cl. ..................... 33/275 R; 33/283; 33/295; 33/395
[58] Field of Search ................. 33/395, 391, 390, 290, 33/286, 287, 275 R, 333, 295, 291, 292, 227, 228, 283, 282, 281, 293

[56] References Cited

U.S. PATENT DOCUMENTS

| 1,346,547 | 7/1920 | Lackland | 33/395 |
| 2,544,438 | 3/1951 | Allgeo | 33/395 |
| 2,834,118 | 5/1958 | Jackson | 33/395 X |
| 3,707,772 | 1/1973 | Cotter | 33/395 |
| 3,945,129 | 3/1976 | Bergkvist | 33/399 |

Primary Examiner—William D. Martin, Jr.
Attorney, Agent, or Firm—LeBlanc, Nolan, Shur & Nies

[57] ABSTRACT

A suspension device for an angle indicator intended to indicate the angle of an object to the vertical line and comprising two angle-indicating devices designed each to indicate a predetermined angle to the vertical line and located in two planes perpendicular to each other. The suspension device comprises an outer ring which is attached rotatably about a diameter of the ring and connected to the object, and an inner ring which is located perpendicularly to and inside of said outer ring. The inner ring is movable along the inside of the outer ring. Attachment components are provided for the angle indicator inside of the inner ring and enable movement along the inner ring. According to a preferred embodiment, the attachment components are designed to attach the angle indicator so that one of the angle-indicating devices indicates the angle of the plane of the inner ring to the vertical line.

9 Claims, 7 Drawing Figures

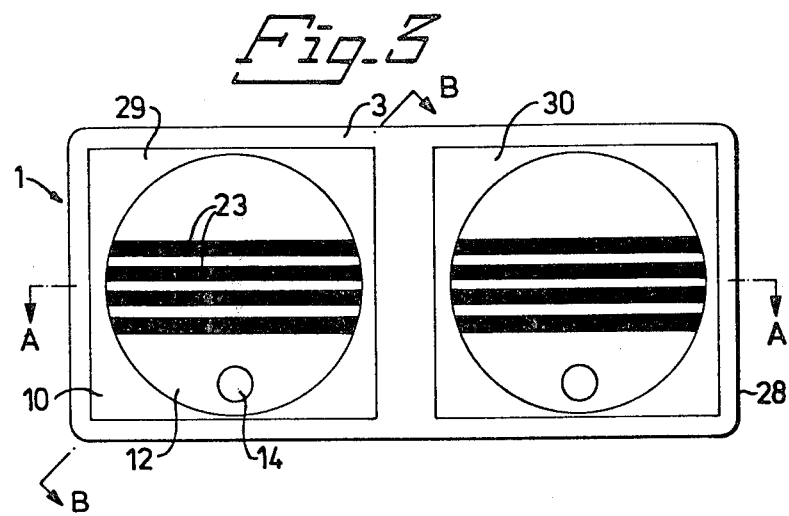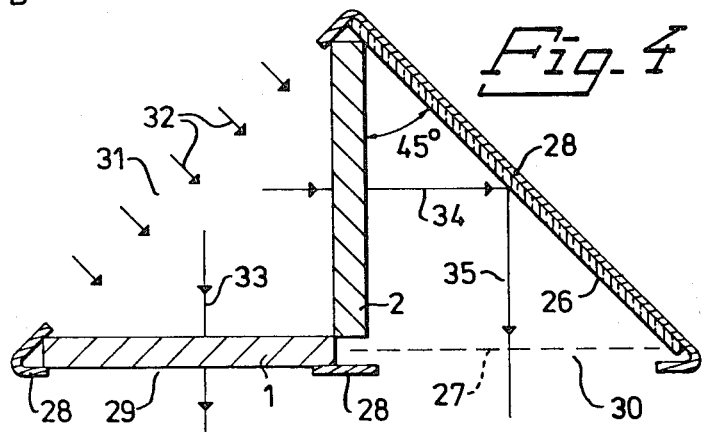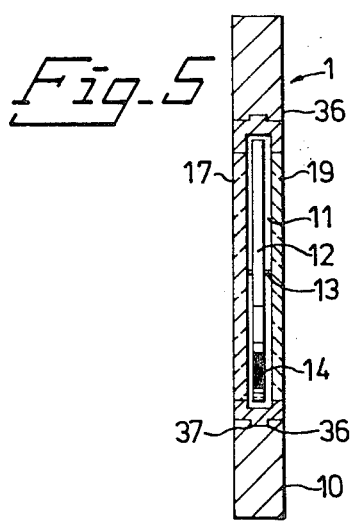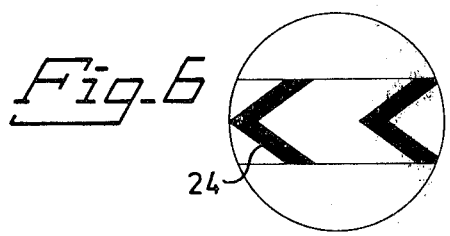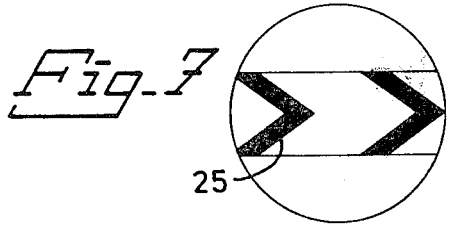

SUSPENSION DEVICE FOR ANGLE INDICATOR

This invention relates to a suspension device for an angle indicator, more precisely for an angle indicator for two directions perpendicular to each other.

The device is intended to be used primarily for indicating and directioning an object in two mutually perpendicular directions to the vertical line.

In Swedish Pat. No. 7806036-5, (corresponding U.S. application Ser. No. 40,393, filed May 18, 1979, replaced by U.S. Ser. No. 221,374, filed Dec. 30, 1980), an angle indicator for two mutually perpendicular directions is described, which comprises two angle-indicating devices, for example according to Swedish Pat. No. 7611511-2, each of which includes a pair of screens, of which each screen consists of opaque lines separated by transparent interstices, in such a manner, that an interference pattern, a so-called moire pattern, is formed when light is transmitted through each screen unit. The first screen is stationary, and the second step is freely rotatable to assume a predetermined position relative to the vertical line. The two angle-indicating devices are located in planes perpendicular to each other. A mirror is provided to project a reflected image of one of the angle-indicating devices in a plane, in which the other angle-indicating device is located. When observing the angle indicator, the two moiré patterns created through the angle-indicating devices seem to be located to the side of each other. The position of the object, thus, in the two directions perpendicular to each other can be read from one viewing direction.

At this device the setting of desired angles of the object is effected, in that on each of the angle-indicating devices the stationary screen is turned in relation to the housing associated with the angle indicators, whereafter the object is turned until a characteristic interference pattern is formed. This pattern arises when the screen lines of the two screens in the angle indicator device are in parallel.

This implies, thus, that the angle indicator device will incline relative to the horizontal plane, presupposed that some other directioning of the object than just a vertical one is made.

According to this embodiment, furthermore, the housings of the angle-indicating devices must be attached non-rotatably to the object, which implies that the instrument cannot be directioned to a fixed point in a desired manner.

When, for example, a series of holes are to be drilled for blasting a road, it is desired to align a series of drilling places along a line. This line generally is chosen as a direction to a fixed point, such as an object in the landscape, for example a church tower or a high tree.

In connection therewith, thus, it is desired so to direction the drill rod that subsequent drill holes are in parallel with each other, and so that they form a certain angle both to a vertical plane through, for example, said church tower and a certain angle of 90° to said vertical plane. As the aforesaid angle indicator is not rotatably connected to the drill rod, such a directioning cannot be carried out.

The present invention solves the aforesaid problem and it provides at the same time an efficient protection for the angle-indicating devices.

The invention, thus, relates to a suspension device a suspension device for an angle indicator intended to indicate the angle of an object relative to the vertical line and comprising two angle-indicating devices, each designed to indicate a predetermined angle to the vertical line, and located in two planes perpendicular to each other, the suspension device having an outer ring rotatable about one of its diameters.

At its periphery the ring is connected by one or several axles or trunnions to the object. An inner ring is located perpendicularly to and inside of the outer ring and movable around the inner periphery of the outer ring. Attachment components attach the angle indicator inside of the inner ring, such attachment components being movable around the inner periphery of the inner ring, and the outer ring being rotatable about the axis of the axles, which axis is in parallel relationship with a direction characteristic for the object, for example its longitudinal direction.

Figure 2:
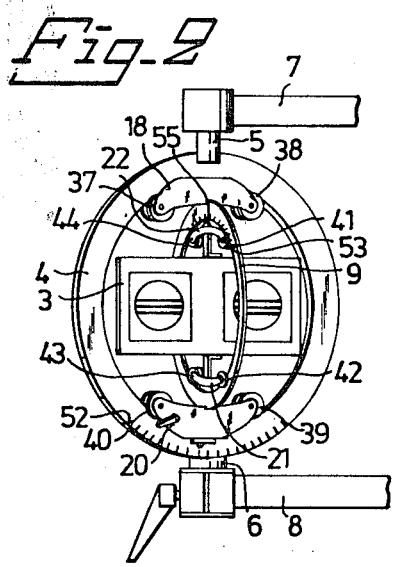

The invention is described in the following, with reference to the accompanying drawings, in which FIG. 1 schematically shows the device according to the invention seen in the viewing direction, FIG. 2 is a schematic perspective view of the device according to FIG. 1, FIG. 3 shows an angle indicator according to the aforesaid Swedish Pat. No. 7806036-5 and U.S. application Ser. No. 221,374, which modified to some extent preferably is used together with the present invention, FIG. 4 is a horizontal section A-A according to FIG. 3, FIG. 5 is a section through an angle-indicating device according to FIG. 3.

FIGS. 6 and 7 show two different moiré patterns.

In FIGS. 3, 4 and 5 indicating devices 1 are shown, which are of the kind disclosed in the above Swedish patent. Their structural design is described below.

FIG. 5 is a section through an angle-indicating device 1. The device comprises a mounting 10, which for example has the form of a rectangular or square housing. The housing 10 includes an inner cavity 11, which preferably has the form of a circular-cylindric space. In said cavity 11 a movable member 12 is supported about an axle 13. The center of gravity of said movable member 12 is offset outside the rotation axle 13, in that a portion 14 with a higher density than the remaining member is attached between the rotation axle 13 and the periphery of said movable member 12. It is obvious, thus, that the movable member always is rotated so that a line through its rotation axle and the center of gravity coincides with the vertical line.

The movable member 12 has the form of a screen plate, the screen consisting of opaque lines. The wall 17 of the housing 10 which faces toward the viewer also includes a screen plate. The wall 19 of the housing 10 which is remote from the viewer is transparent. The structure of the screens, of course, can be varied, but according to a preferred embodiment in the Swedish Pat. No. 7806036-5, the screen of the movable member 12 has a constant division, while the screen of the fixed portion 17 is divided into two areas with different divisions. The areas preferably are divided by a diameter of the screen plate 17. One of said areas has a division denser than the screens of the movable member 12, and the other one of said areas has a division which is correspondingly more sparse than the screen of the movable member 12. By means of said divisions a moiré pattern is obtained which consists of dark, wide, mutually parallel strips 23, see FIG. 3, when the torque lines of the two screen plates 12,17 are in parallel relative each other. When the movable member 12 is turned through a small angle in clockwise direction relative to the housing 10, a moiré pattern is shown in FIG. 6 is formed, due to the fact that the opaque lines on the two screen plates form said angle relative to each other. At said pattern the wide dark strips 24 are angled to the screen of the fixed portion 17 and mirrored in the diameter, which distinguishes the said two areas so that the strips resemble arrows. When the movable member 12 is turned through a small angle counter-clockwise relative to the housing 10, in a corresponding manner a moiré pattern as shown in FIG. 7 arises, which has wide dark strips 25, resembling arrows, but which are directed in a direction opposite to that shown in FIG. 6.

The said moire patterns are very sensitive to small changes of angles and are extremely easy to read, so that setting and reading by such an angle indicator can be carried out with higher precision.

Each angle-indicating device 1,2 comprises a pair of screens 12,17. The two pairs of screens are positioned in mutually perpendicular planes, see FIG. 4, whereby each of the pairs is capable to indicate the position of an object in one of two mutually perpendicular planes. In order to be able to simultaneously read both indicating devices, a mirror 26 is provided which projects a reflected image of one of the indicating devices 2 in the plane, in which the other one of the indicating devices 1 is located. This plane is indicated in FIG. 4 by the dashed line 27.

When viewing the angle indicator according to the invention, it seems hereby that the two moire patterns created through the angle-indicating devices 1,2 are located to the side of each other, as shown in FIGS. 1 and 3, where the right-hand angle-indicating device is a reflected image. The arrows 31,32,33,34 and 35 indicate light.

The angle-indicating devices 1,2 and the mirror 26 are attached in a common enclosing housing 28 having an opening 29 and an opening 30 for viewing the indicating devices.

The present invention relates to a suspension device for an angle indicator 3 comprising two angle-indicating devices 1,2. As mentioned, the angle indicator 3 is intended to indicate the angle of an object of the vertical line. A very essential example of such an object is a drill rod on a so-called open-cut drilling machine, i.e. a drilling machine for surface drilling. The invention, of course, can be applied to a great number of other objects. At open-cut drilling machines it is necessary to be able to view an instrument, which shows the position of the drill rod relative to the vertical line in a clear manner, and to rapidly make the setting with high precision.

The present invention is applied preferably in connection with the angle indicator described above, but it can, of course, be applied also to other types of angle indicators.

The suspension device comprises an outer ring 4, which is rotatably attached about a diameter of the ring 4, and which is connected at its periphery with said object by two axles 5,6. Said axles 5,6 are connected to the object, e.g. a drill rod, via stays 7,8. An axle line through the axles 5,6 is in parallel with a direction characteristic for the object, for example its longitudinal direction. An inner ring 9 is located perpendicularly to and inside of the outer ring 4. Said inner ring 9 is movable along the outer ring 4. An attachment means, preferably two attachment means 15,16 are provided for attaching said angle indicator 3 inside of said inner ring 9. The attachment means 15,16 are movable along the inner ring 9.

The attachment means 15,16 are designed for attaching the angle indicator 3 in such a manner, that one of said angle-indicating devices 1,2 indicates the angle of the plane of the inner ring 9 relative to the vertical line. At a device according to FIGS. 3,4 this implies, that one of the angle-indicating devices 1,2 is located in a plane in parallel with the plane defined by the inner ring 9.

The inner ring 9 is provided with carriages 18,20 located in at least two opposed places and capable to run against the inside of the outer ring 4. The said attachment means 15,16 further comprise carriages 21,22 capable to run against the inside of the inner ring 9 at least in two opposed places of the same.

The two carriages 18,20 associated with the inner ring, and the two carriages 21,22 associated with the attachment means 15,16 preferably are arranged diametrically opposite the ring 4 and, respectively, 9, against which they are to run.

Each of the carriages 18,20,21,22 comprises two wheels 37-44 at each end of the respective carriage, which wheels run on both sides of the ring and against inner periphery of the respective ring 4,9 as appears from FIG. 1.

At least one of the carriages 18,20 and, respectively, 21,22 are lockable relative to the ring 4 and, respectively, 9, against which they are to run.

A locking means comprises a bolt 45-48 with associated handle, which upon tightening presses the free legs of the associated U-shaped carriage 18,20,21,22 against the respective ring 4,9.

The axle 6 is also lockable relative to the stay 8 by means of a bolt 49 with associated handle 50, which upon tightening causes the bearing housing 51 of the axle 6 to be tightened about the axle 6.

On both rings an angle dial 52,53 and indication arrows 54,55 are provided for setting the position of a carriage 20,22, and therewith of the angle indicator 3, relative to the dial.

The angle indicator 3 according to the present invention is designed so that the screen lines of the fixed screens 17 of the two angle-indicating devices 1,2 are in parallel with the horizontal plane when the inner ring 9 and the angle-indicating devices 1,2 are located in the vertical planes. At this setting of the device said indication arrows 54,55 indicate 0° on the angle dial.

For using the device, the outer ring 4 or the inner ring 9 is directed, for example, to a church tower when drilling shall be carried out along a line extending through the drilling machine and the church tower. Thereafter two mutually perpendicular directions are set in the way stated below to a vertical plane, in which the said line is located. The rings then are locked in the position thus set.

The angle indicator 3 thereafter is turned by means of the carriages 21,22 in relation to the inner ring 9 until the angle-indicating device 2 assumes the desired angle to the vertical line. Said angle is set by the indication arrow 55 and the dial 53. The carriages 21,22 then are locked, and the inner ring 9 is turned by the carriages 18,20 relative to the outer ring 4 until its angle-indicating device 1 assumes the desired angle to the vertical line. Said angle is set by the indication arrow 54 and the dial 52.

The object thereafter is set in such an angle to the vertical line, that the two angle-indicating devices 1,2 show an interference pattern as shown in FIG. 3. The object thereby forms an inclination in the three-dimensional space to the vertical line, which inclination is defined by the two angles set by means of the carriages.

When the angle indicator 3 deviates from the vertical line, seen in a plane in parallel with the first one of the indicating devices, but coincides with the vertical line, seen in a plane in parallel with the second one of the indicating devices, the second indicating device shows a pattern corresponding to the one known in FIG. 6 or 7, while the first indicating device shows a pattern corresponding to the one shown in FIG. 3.

When the object deviates from the vertical line seen in both the respective planes, which are in parallel with the respective indicating device, both indicating devices show a pattern according to FIG. 6 or 7.

When the drill rod thus changes its position relative to the position first aligned, one or both of the angle-indicating devices show a pattern according to FIG. 6 and/or 7.

When a hole has been drilled, the drill rod and possibly the entire machine is moved a distance along said line, whereafter the position of the drill rod is adjusted so that the suspension device again is aligned with the church tower, without changing the setting of the rings relative to the drill rod. The drill rod thus is aligned so as to drill a hole in parallel with the previously drilled hole and along said line. It is, thus, fully clear that a series of parallel holes can be obtained in an easy way. It is, of course, possible to change some angle from one hole to the other, if so desired.

The present invention, thus, renders it possible to arbitrarily direction an object in an inclination in the three-dimensional space to a vertical plane and thereafter to check from a viewing direction whether said inclination still prevails. The directioning proper of the object, of course, is extremely simple by means of the device described with reference in FIGS. 1, 3 and 4.

The rings enclosing the angle indicator 3, further, provide good protection for the same.

The present invention shall not be regarded restricted to the embodiment described above. Other angle indicators, for example, can be used, and the carriages can be replaced by other means without abandoning the invention idea.

The invention, thus, can be varied within the scope of the attached claims.

I claim:

1. A suspension device for use in combination with an angle indicator (3) intended to indicate the angle of an object relative to the vertical line and comprising two angle-indicating devices (1,2), each designed to indicate a predetermined angle to the vertical line, and located in two planes perpendicular to each other, characterized in the suspension device comprises an outer ring (4), support means enabling rotation of said outer ring about a diameter of said outer ring including axle means on the periphery, and having an axis including a diameter, of said outer ring, said support means adapted to be secured to the object whose angle is to be indicated, an inner ring (9) located perpendicularly to and inside of the outer ring (4) and movable along said outer ring (4), and attachment means (15,16) for attaching said angle indicator (3) inside of said inner ring (9), which attachment means (15,16) are movable along said inner ring (9), and that the outer ring (4) is rotatable about the axis of said axle means which is in parallel with a direction characteristic for the object, for example its longitudinal direction.

2. A suspension device as defined in claim 1, characterized in that said attachment means (15,16) is designed so to attach said angle indicator (3), that one of said angle-indicating devices (1,2) indicates the angle of the plane of the inner ring (9) to the vertical line.

3. A suspension device as defined in claim 1 or 2, characterized in that each of the rings (4,9) is provided with an angle dial (52,53) and that a carriage (20,22) running against each of the rings (4,9) is provided with an indication arrow (54,55) for setting the position of a carriage (20,22) and therewith of said angle indicator (3) relative to said angle dial (54,55).

4. A suspension device as defined in claim 1 or 2, characterized in that the inner ring (9) is provided in at least two opposed places with a carriage (18,20), which are capable to run against the inside of the outer ring (4).

5. A suspension device as defined in claim 1 or 2, characterized in that said attachment means (15,16) comprise carriages (21,22) capable to run against the inside of the inner ring (9) in at least two opposed places thereof.

6. A suspension device as defined in claim 4 or 5, characterized in that for both rings, two carriages (18,20,21,22) are arranged diametrically opposed relative to the ring (4,9), against which they are capable to run.

7. A suspension device as defined in claim 6, characterized in that each of the carriages (18,20,21,22) comprises two wheels (37-40) at each end of the carriages, which wheels are capable to run on both sides of the ring (4,9) and against the inner perphery of the ring (4,9).

8. A suspension device as defined in claim 5, characterized in that at least one of the carriages (18,20,21,22) is lockable relative to the ring (4,9), against which they are capable to run.

9. A suspension device as defined in claim 7, characterized in that at least one of the carriages is lockable relative to the ring against which they are capable to run.

* * * * *

UNITED STATES PATENT AND TRADEMARK OFFICE
CERTIFICATE OF CORRECTION

PATENT NO. : 4,343,090
DATED : August 10, 1982
INVENTOR(S) : Bergkvist, Lars A.

It is certified that error appears in the above—identified patent and that said Letters Patent is hereby corrected as shown below:

Column 2, line 66, Please change "the torque lines" to read --the opaque lines--.

Column 6, line 36 of Claim 6, please change "in claim 4 or 5" to read --in claim 5--.

Signed and Sealed this

Twenty-ninth Day of March 1983

[SEAL]

Attest:

GERALD J. MOSSINGHOFF

Attesting Officer

Commissioner of Patents and Trademarks